US011880381B1

(12) United States Patent
Al-Alusi et al.

(10) Patent No.: US 11,880,381 B1
(45) Date of Patent: Jan. 23, 2024

(54) NOTEBOOKS WITH PREDICTABLE BEHAVIOR

(71) Applicant: Snowflake Inc., Bozeman, MT (US)

(72) Inventors: Annissa Al-Alusi, Orinda, CA (US); Istvan Cseri, Seattle, WA (US); Yifung Lin, Los Altos, CA (US); Jue Liu, San Mateo, CA (US); Michael Joseph Papale, Seattle, WA (US); William A. Pugh, Seattle, WA (US); Jeffrey Shaw, San Francisco, CA (US); Wei Song, Bellevue, WA (US); Thiago Teixeira, San Francisco, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/351,661

(22) Filed: Jul. 13, 2023

(51) Int. Cl.
*G06F 16/248* (2019.01)
*G06F 16/2453* (2019.01)
*G06F 16/2455* (2019.01)

(52) U.S. Cl.
CPC ...... *G06F 16/248* (2019.01); *G06F 16/24542* (2019.01); *G06F 16/24568* (2019.01)

(58) Field of Classification Search
CPC ............. G06F 16/248; G06F 16/24542; G06F 16/24568
See application file for complete search history.

(56) References Cited

U.S. PATENT DOCUMENTS

| 8,583,631 | B1* | 11/2013 | Ganapathi | G06F 16/245 |
| | | | | 707/722 |
| 2002/0059203 | A1* | 5/2002 | Witkowski | G06F 16/283 |
| | | | | 707/999.102 |
| 2004/0006574 | A1* | 1/2004 | Witkowski | G06F 16/2264 |
| 2004/0034616 | A1* | 2/2004 | Witkowski | G06F 16/283 |
| 2004/0133567 | A1* | 7/2004 | Witkowski | G06F 40/18 |
| 2004/0133568 | A1* | 7/2004 | Witkowski | G06F 16/24 |
| 2014/0208218 | A1* | 7/2014 | Carasso | G06F 16/332 |
| | | | | 715/738 |

\* cited by examiner

*Primary Examiner* — Jorge A Casanova
(74) *Attorney, Agent, or Firm* — Schwegman Lundberg & Woessner, P.A.

(57) ABSTRACT

A data platform for running a subset of cells in a notebook is provided. The data platform receives a run cells message from a notebook user interface (UI) application specifying the subset of cells to run. For each cell in the subset, the data platform runs the cell to generate a set of results, generates a cell execution stream using the results, stores the stream, and transmits the stream to the notebook UI application. The notebook UI application generates a display for the user using the cell execution stream. The data platform provides an efficient way to run specific cells in a notebook and display the results to the user.

27 Claims, 12 Drawing Sheets

NOTEBOOKS WITH PREDICTABLE BEHAVIOR

TECHNICAL FIELD

Examples of the disclosure relate generally to data platforms and, more specifically, to user interfaces for viewing data.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

Management of a database is facilitated by having user interfaces.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
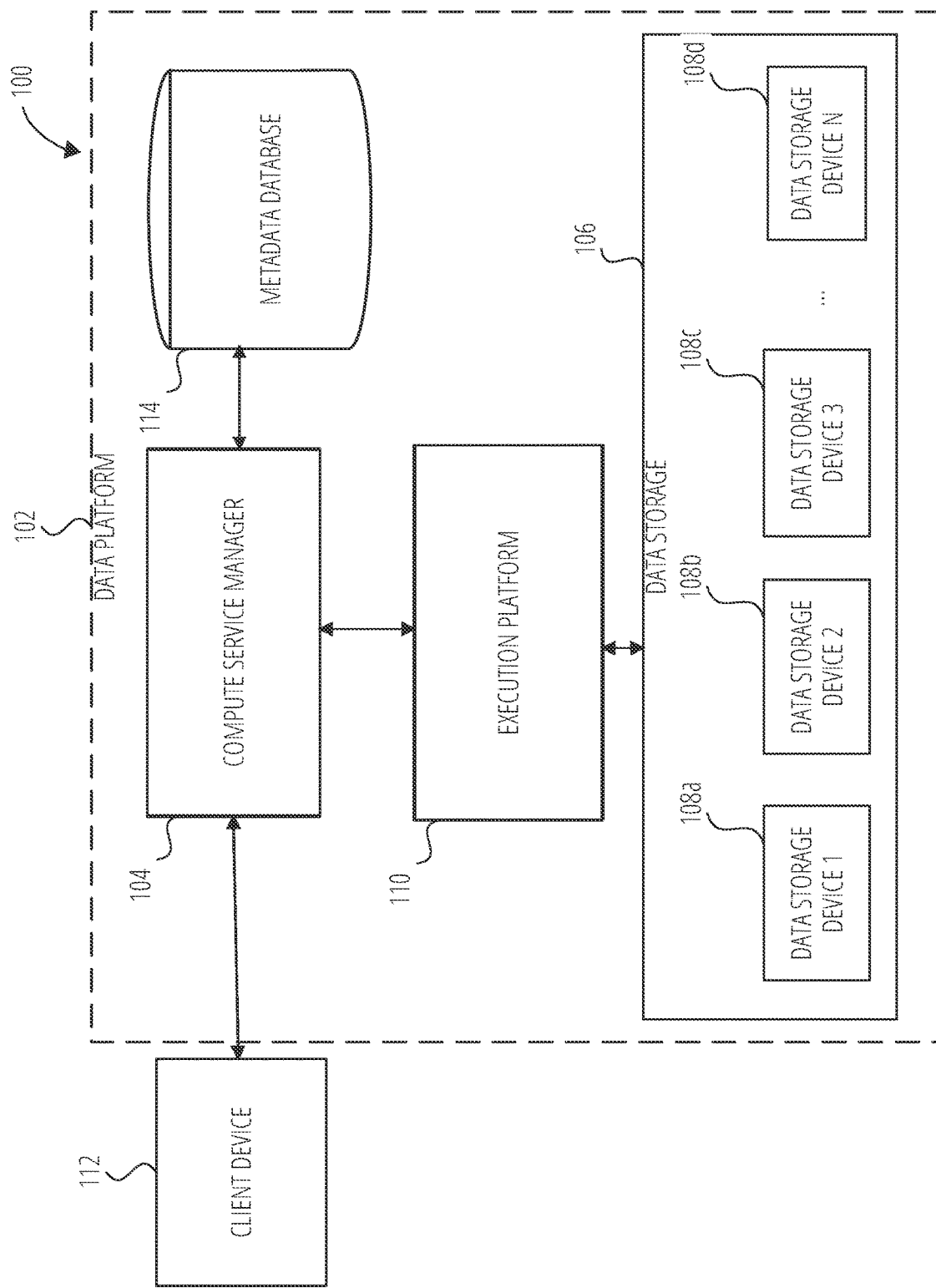
FIG. 1 illustrates an example computing environment that includes a network-based data platform in communication with a cloud storage provider system, in accordance with some examples.

Notebook interactive computing environments are popular with users of complex data systems as a notebook allows users to create, share, and execute code, visualizations, and explanatory text in a single document.

A notebook typically consists of a set of cells that can contain different types of content, including code snippets, text explanations, mathematical formulas, visualizations, and more. Each cell can be individually executed, enabling users to iteratively develop and test their code or analyze data step by step.

Notebooks provide a unified interface where users can combine code, documentation, and visualizations, making it easier to communicate findings and insights. They are particularly popular in data science, machine learning, and data engineering workflows, as they facilitate the interactive exploration and experimentation with data.

Within a data platform, notebooks often integrate with various data processing frameworks and libraries, such as Python's Pandas, NumPy, and scikit-learn, or R's tidyverse packages. This integration allows users to leverage the platform's capabilities, such as distributed computing, data querying, and visualization tools, to perform complex data operations and analyze large datasets efficiently.

Notebook User Interface (UI) applications are widely used for creating and sharing documents that contain code, visualizations, and narrative text. These applications allow users to create interactive documents that can be used for data analysis, scientific research, and education. In these applications, users can create a set of cells that contain code, text, and visualizations. These cells can be executed in a specific order to generate a set of results that can be used to create a narrative or to perform data analysis.

Previous approaches to running cells in a notebook have focused on executing cells in a random order determined by a user's random interactions with the notebook. This leads to notebooks not generating predictable results. These approaches do not provide the flexibility to run a subset of cells in a notebook. Additionally, previous approaches do not provide a way to store the execution stream of cells and transmit it to the notebook UI application for generating a display presented to a user.

Other approaches have focused on generating reports or presentations from a notebook UI application. These approaches allow users to create a report or presentation by selecting cells from a notebook and arranging them in a specific order. However, these approaches do not provide a way to store the execution stream of cells and transmit it to the notebook UI application for generating a display presented to a user in a way that can enforce authorization controls.

In some examples, the techniques described herein relate to a computer-implemented method including: receiving, by at least one processor, from a notebook User Interface (UI) application, a run cells message, the run cells message specifying a subset of cells of a set of cells of a notebook to run; and for each cell in the subset of cells, performing operations including: running, by the at least one processor, the cell to generate a set of results; generating, by the at least one processor, a cell execution stream using the set of results; storing, by the at least one processor, the cell execution stream; and transmitting, by the at least one processor, the cell execution stream to the notebook UI application, wherein the notebook UI application generates a display presented to a user using the cell execution stream.

In some examples, the techniques described herein relate to a computer-implemented method, wherein the subset of cells is a proper subset.

In some examples, the techniques described herein relate to a computer-implemented method, wherein the set of cells is an ordered set.

In some examples, the techniques described herein relate to a computer-implemented method, wherein the subset of cells is an ordered set and the subset of cells are run in a sequence in accordance with a cell order of the subset of cells.

In some examples, the techniques described herein relate to a computer-implemented method, wherein running the each cell includes: determining a dependency of the each cell on a previous result of a preceding cell; determining an availability of the previous result of the preceding cell; in response to determining the previous result of the preceding cell is available, retrieving the result of the preceding cell; and in response to determining the previous result of the preceding cell is not available, running the preceding cell to generate the previous result.

In some examples, the techniques described herein relate to a computer-implemented method, wherein the run cells message includes a cell update semantics field that specifies whether the subset of cells is an update of the notebook.

In some examples, the techniques described herein relate to a computer-implemented method, wherein the cell execution stream is stored separately from the notebook.

In some examples, the techniques described herein relate to a computer-implemented method, further including: loading the notebook; and soft-starting the notebook by retrieving the cell execution stream.

In some examples, the techniques described herein relate to a computer-implemented method, wherein the cell execution stream includes a message path specifying a cell of the notebook UI display for display of the set of results.

In some examples, the techniques described herein relate to a computer-implemented method, wherein the message path includes a root field that specifying a pane of the notebook UI display for display of the set of results.

In some examples, the techniques described herein relate to a data platform including: at least one processor; and at least one memory storing instructions that, when executed by the at least one processor, cause the data platform to perform operations including: receiving from a notebook UI application, a run cells message, the run cells message specifying a subset of cells of a set of cells of a notebook to run; and for each cell in the subset of cells, performing operations including: running the each cell to generate a set of results; generating a cell execution stream using the set of results; storing the cell execution stream; and transmitting the cell execution stream to the notebook UI application, wherein the notebook UI application generates a display presented to a user using the cell execution stream.

In some examples, the techniques described herein relate to a machine-storage medium including machine-readable instructions that, when executed by a machine, cause the machine to perform operations including: receiving from a notebook UI application, a run cells message, the run cells message specifying a subset of cells of a set of cells of a notebook to run; and for each cell in the subset of cells, performing operations including: running the each cell to generate a set of results; generating a cell execution stream using the set of results; storing the cell execution stream; and transmitting the cell execution stream to the notebook UI application, wherein the notebook UI application generates a display presented to a user using the cell execution stream.

Reference will now be made in detail to specific examples for carrying out the inventive subject matter. Examples of these specific examples are illustrated in the accompanying drawings, and specific details are set forth in the following description in order to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

FIG. 1 illustrates an example computing environment 100 that includes a data platform 102 in communication with a client device 112, in accordance with some examples. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a data storage 106, a compute service manager 104, an execution platform 110, and a metadata database 114. The data storage 106 comprises a plurality of computing machines and provides on-demand computer system resources such as data storage and computing power to the data platform 102. As shown, the data storage 106 comprises multiple data storage devices, such as data storage device 1 108a, data storage device 2 108b, data storage device 3 108c, and data storage device N 108d. In some examples, the data storage devices 1 to N are cloud-based storage devices located in one or more geographic locations. For example, the data storage devices 1 to N may be part of a public cloud infrastructure or a private cloud infrastructure. The data storage devices 1 to N may be hard disk drives (HDDs), solid state drives (SSDs), storage clusters, Amazon S3™ storage systems or any other data storage technology. Additionally, the data storage 106 may include distributed file systems (e.g., Hadoop Distributed File Systems (HDFS)), object storage systems, and the like.

The data platform 102 is used for reporting and analysis of integrated data from one or more disparate sources including the storage devices 1 to N within the data storage 106. The data platform 102 hosts and provides data reporting and analysis services to multiple consumer accounts. Administrative users can create and manage identities (e.g., users, roles, and groups) and use privileges to allow or deny access to identities to resources and services. Generally, the data platform 102 maintains numerous consumer accounts for numerous respective consumers. The data platform 102 maintains each consumer account in one or more storage devices of the data storage 106. Moreover, the data platform 102 may maintain metadata associated with the consumer accounts in the metadata database 114. Each consumer account includes multiple objects with examples including users, roles, privileges, a datastores or other data locations (herein termed a "stage" or "stages"), and the like.

The compute service manager 104 coordinates and manages operations of the data platform 102. The compute service manager 104 also performs query optimization and compilation as well as managing clusters of compute services that provide compute resources (also referred to as "virtual warehouses"). The compute service manager 104 can support any number and type of clients such as end users providing data storage and retrieval requests, system administrators managing the systems and methods described herein, and other components/devices that interact with compute service manager 104. As an example, the compute service manager 104 is in communication with the client device 112. The client device 112 can be used by a user of one of the multiple consumer accounts supported by the data platform 102 to interact with and utilize the functionality of the data platform 102. In some examples, the compute service manager 104 does not receive any direct communications from the client device 112 and only receives communications concerning jobs from a queue within the data platform 102.

The compute service manager 104 is also coupled to metadata database 114. The metadata database 114 stores data pertaining to various functions and examples associated with the data platform 102 and its users. In some examples, the metadata database 114 includes a summary of data stored in remote data storage systems as well as data available from a local cache. In some examples, the metadata database 114 may include information regarding how data is organized in remote data storage systems (e.g., the database storage 106) and the local caches. In some examples, the metadata database 114 include data of metrics describing usage and access by providers and consumers of the data stored on the data platform 102. In some examples, the metadata database 114 allows systems and services to determine whether a piece of data needs to be accessed without loading or accessing the actual data from a storage device.

The compute service manager 104 is further coupled to the execution platform 110, which provides multiple computing resources that execute various data storage and data retrieval tasks. The execution platform 110 is coupled to the database storage 106. The execution platform 110 comprises a plurality of compute nodes. A set of processes on a compute node executes a query plan compiled by the compute service manager 104. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 104; a fourth process to establish communication with the compute service manager 104 after a system boot; and a fifth process to handle all communication with a compute cluster for a given job provided by the compute service manager 104 and to communicate information back to the compute service manager 104 and other compute nodes of the execution platform 110.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

As shown in FIG. 1, the data storage devices data storage device 1 108a to data storage device N 108d are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 104, metadata database 114, execution platform 110, and data storage 106 are shown in FIG. 1 as individual discrete components. However, each of the compute service manager 104, metadata database 114, execution platform 110, and data storage 106 may be implemented as a distributed system (e.g., distributed across multiple systems/platforms at multiple geographic locations). Additionally, each of the compute service manager 104, metadata database 114, execution platform 110, and data storage 106 can be scaled up or down (independently of one another) depending on changes to the requests received and the changing needs of the data platform 102. Thus, in the described examples, the data platform 102 is dynamic and supports regular changes to meet the current data processing needs.

During operation, the data platform 102 processes multiple jobs determined by the compute service manager 104. These jobs are scheduled and managed by the compute service manager 104 to determine when and how to execute the job. For example, the compute service manager 104 may divide the job into multiple discrete tasks and may determine what data is needed to execute each of the multiple discrete tasks. The compute service manager 104 may assign each of the multiple discrete tasks to one or more nodes of the execution platform 110 to process the task. The compute service manager 104 may determine what data is needed to process a task and further determine which nodes within the execution platform 110 are best suited to process the task. Some nodes may have already cached the data needed to process the task and, therefore, be a good candidate for processing the task. Metadata stored in the metadata database 114 assists the compute service manager 104 in determining which nodes in the execution platform 110 have already cached at least a portion of the data needed to process the task. One or more nodes in the execution platform 110 process the task using data cached by the nodes and, if necessary, data retrieved from the data storage 106. It is desirable to retrieve as much data as possible from caches within the execution platform 110 because the retrieval speed is typically faster than retrieving data from the data storage 106.

As shown in FIG. 1, the computing environment 100 separates the execution platform 110 from the data storage 106. In this arrangement, the processing resources and cache resources in the execution platform 110 operate independently of the database storage devices data storage device 1 108a to data storage device N 108d in the data storage 106. Thus, the computing resources and cache resources are not restricted to a specific one of the data storage device 1 108a to data storage device N 108d. Instead, all computing resources and all cache resources may retrieve data from, and store data to, any of the data storage resources in the data storage 106.

Figure 2:
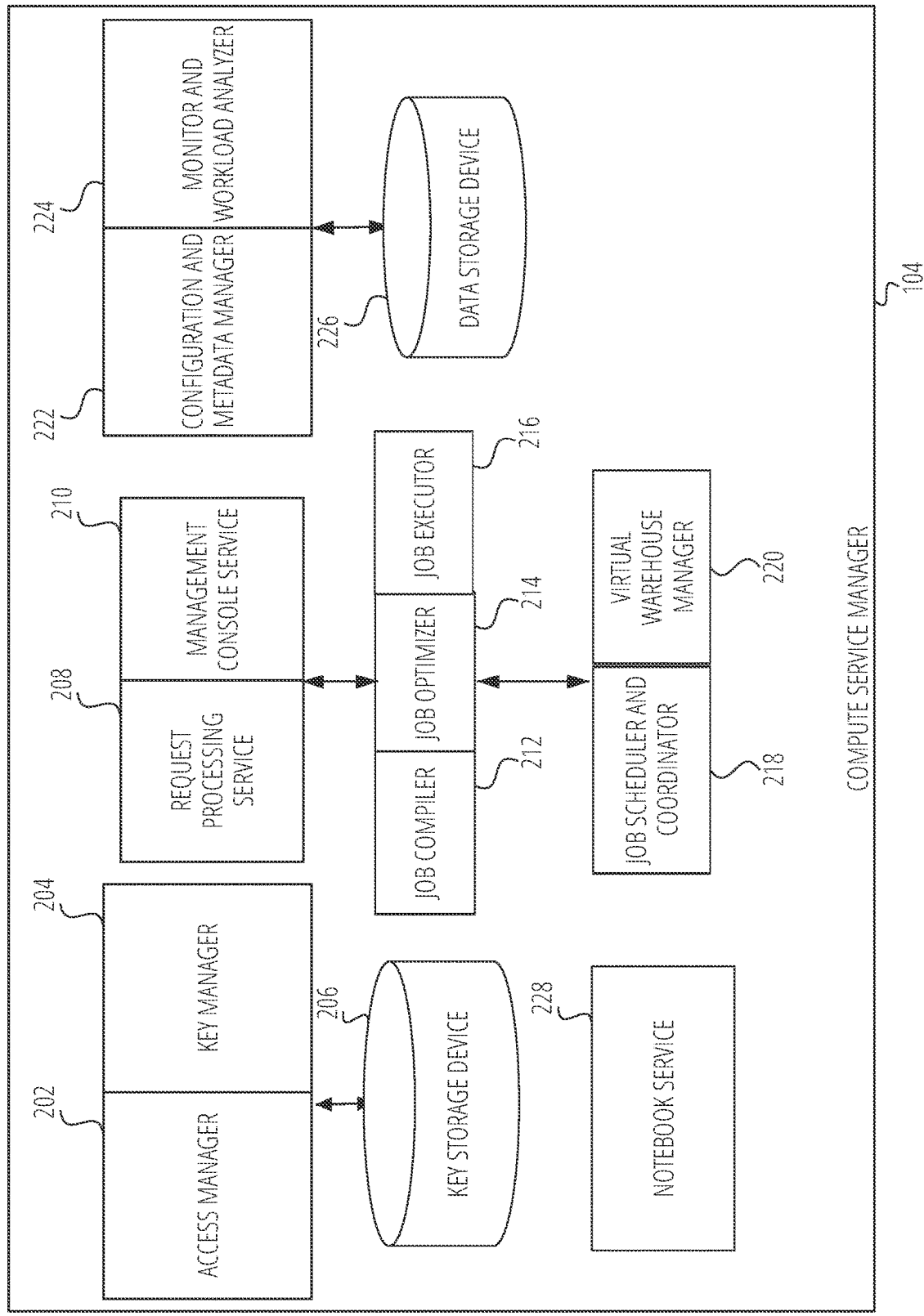
FIG. 2 is a block diagram illustrating components of a compute service manager, in accordance with some examples.

FIG. 2 is a block diagram illustrating components of the compute service manager 104, in accordance with some examples. As shown in FIG. 2, the compute service manager 104 includes an access manager 202 and a key manager 204 coupled to a key storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage 106). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 106.

A management console service 210 supports access to various systems and processes by administrators and other system managers. Additionally, the management console service 210 may receive a request to execute a job and monitor the workload on the system.

The compute service manager 104 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 104.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 determines a priority for internal jobs that are scheduled by the compute service manager 104 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 104 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 104 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in data storage 106, or any other storage device.

Figure 4A:
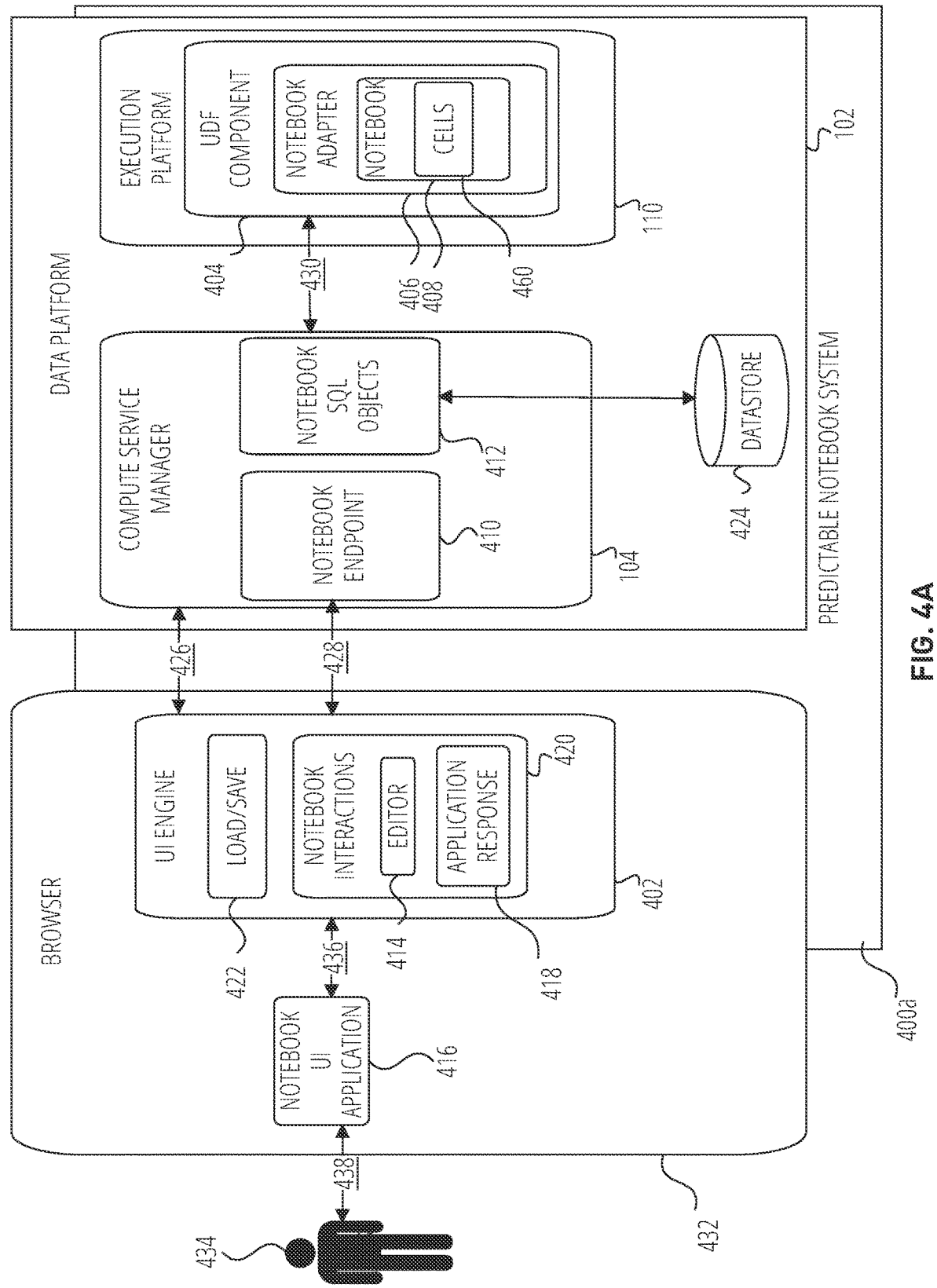
FIG. 4A is a collaboration diagram of a predictable notebook system, in accordance with some examples.

In some examples, the compute service manager 104 further includes a notebook service 228 that provides notebook services to users of the compute service manager 104 as more fully described in reference to FIG. 4A.

The compute service manager 104 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 1 304a) may need to communicate with another execution node (e.g., execution node 2 304b), and should be disallowed from communicating with a third execution node (e.g., execution node 1 316a) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
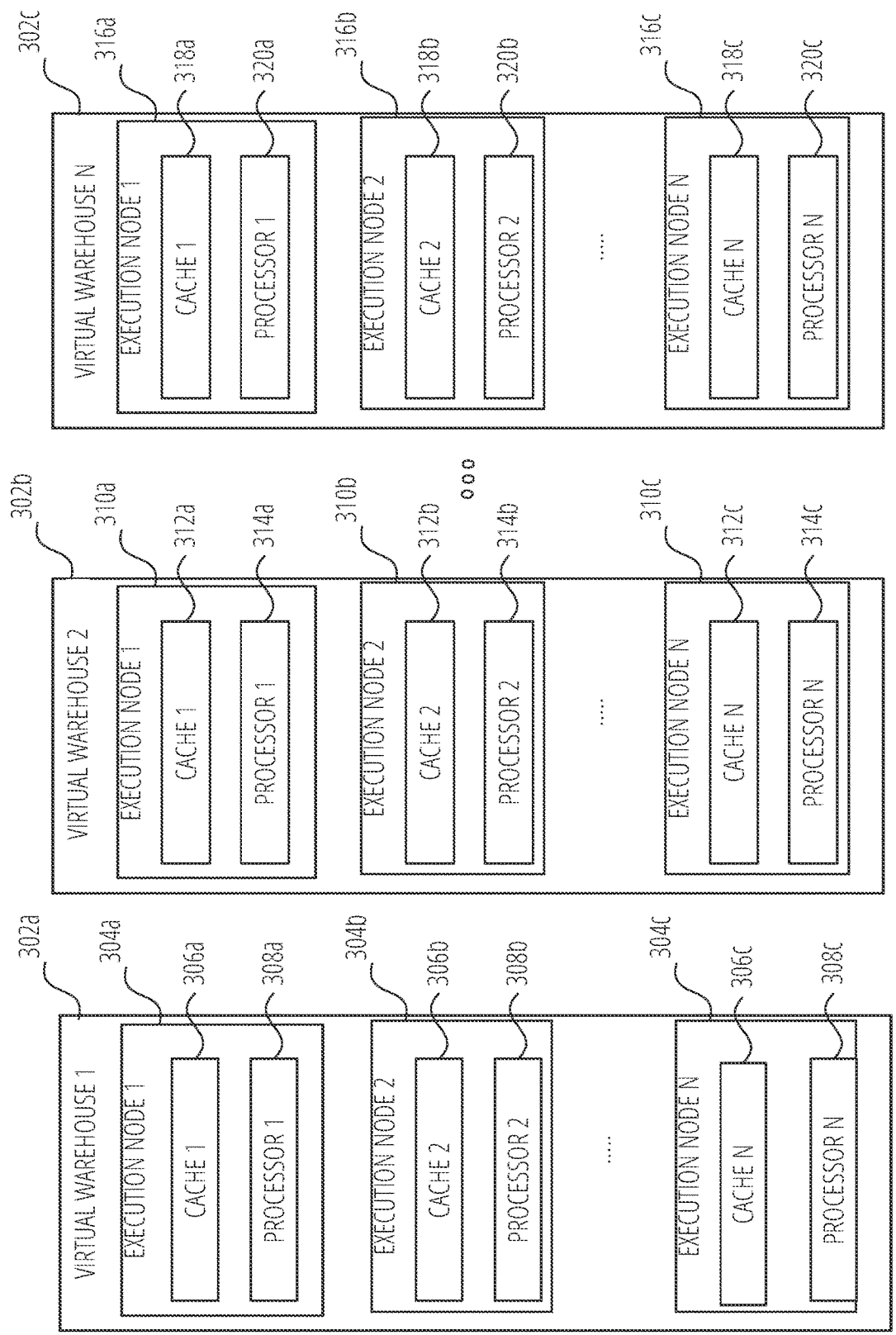
FIG. 3 is a block diagram illustrating components of an execution platform, in accordance with some examples.

FIG. 3 is a block diagram illustrating components of the execution platform 110, in accordance with some examples. As shown in FIG. 3, the execution platform 110 includes multiple virtual warehouses, including virtual warehouse 1 302a, and virtual warehouse 2 302b to virtual warehouse N 302c. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in data storage 106).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1 to N shown in FIG. 1. Thus, the virtual warehouses are not necessarily assigned to a specific data storage device 1 to N and, instead, can access data from any of the data storage devices 1 to N within the data storage 106. Similarly, each of the execution nodes shown in FIG. 3 can access data from any of the data storage devices 1 to N. In some examples, a particular virtual warehouse or a particular execution node may be temporarily assigned to a specific data storage device, but the virtual warehouse or execution node may later access data from any other data storage device.

In the example of FIG. 3, virtual warehouse 1 302a includes a plurality of execution nodes as exemplified by execution node 1 304*a*, execution node 2 304*b*, and execution node N 304*c*. Execution node 1 304*a* includes cache 1 306*a* and a processor 1 308*a*. Execution node 2 304*b* includes cache 2 306*b* and processor 2 308*b*. Execution node N 304*c* includes cache N 306*c* and processor N 308*c*. Each execution node 1 to N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 302*a* discussed above, virtual warehouse 2 302*b* includes a plurality of execution nodes as exemplified by execution node 1 310*a*, execution node 2 310*b*, and execution node N 310*c*. Execution node 1 310*a* includes cache 1 312*a* and processor 1 314*a*. Execution node 2 310*b* includes cache 2 312*b* and processor 2 314*b*. Execution node N 310*c* includes cache N 312*c* and processor N 314*c*. Additionally, virtual warehouse N 302*c* includes a plurality of execution nodes as exemplified by execution node 1 316*a*, execution node 2 316*b*, and execution node N 316*c*. Execution node 1 316*a* includes cache 1 318*a* and processor 1 320*a*. Execution node 2 316*b* includes cache 2 318*b* and processor 2 320*b*. Execution node N 316*c* includes cache N 318*c* and processor N 320*c*.

In some examples, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate examples may include execution nodes containing any number of processors and any number of caches. Additionally, the caches may vary in size among the different execution nodes. The caches shown in FIG. 3 store, in the local execution node, data that was retrieved from one or more data storage devices in data storage 106. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the data storage 106.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse as shown in FIG. 3 has multiple execution nodes. The multiple execution nodes associated with each virtual warehouse may be implemented using multiple computing systems at multiple geographic locations. For example, an instance of virtual warehouse 1 302*a* implements execution node 1 304*a* and execution node 2 304*b* on one computing platform at a geographic location and implements execution node N 304*c* at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in data storage 106, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4B:
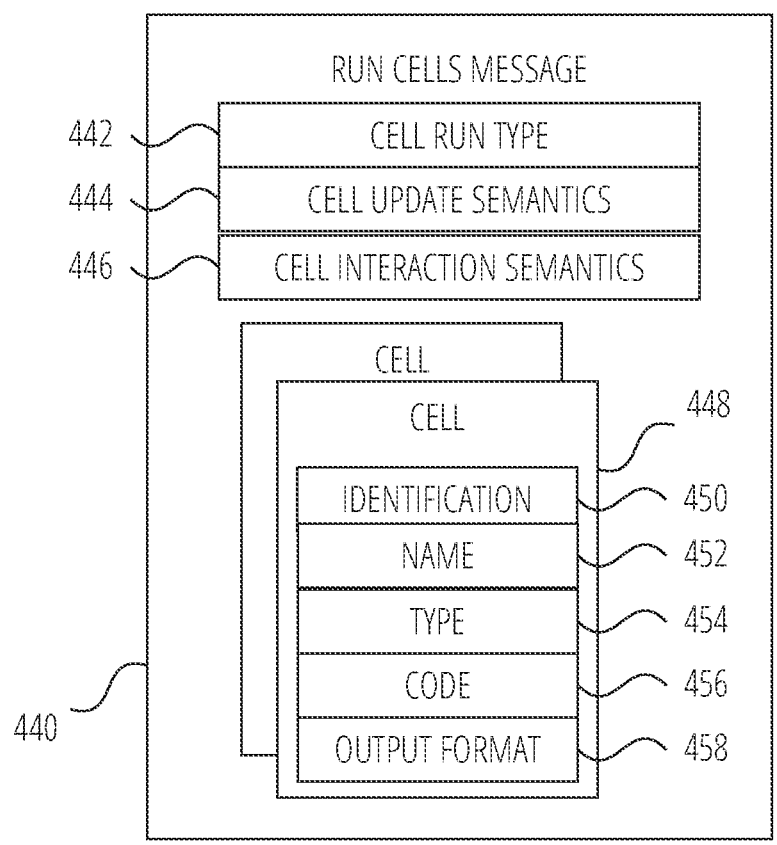
FIG. 4B is a data structure of a run cells message, in accordance with some examples.

FIG. 4A is a collaboration diagram of a predictable notebook system 400*a*, and FIG. 4B is a data structure of a run cells message, in accordance with some examples. A data platform 102 uses a predictable notebook system 400a to provide notebook services 228 to a user 434 of the data platform.

The predictable notebook system 400a comprises a User Interface (UI) engine 402 that communicates with a User Defined Function (UDF) component 404 executing on an execution platform 110 of the data platform. The UI engine 402 and the UDF engine 404 communicate with each other via a compute service manager 104 that performs Create Read Update and Delete (CRUD) operations for the predictable notebook system 400a. The user 434 uses a notebook UI application 416 that is a component of a browser 432 to interact with the predictable notebook system 400a using a set of user interactions 438. The UI engine 402 provides facilities to load and save 422 a notebook, and facilities for notebook interactions 420 such as an editor 414, and viewing an application response 418. In some examples, the UI engine 402 is a component of the data platform 102. In some examples, the UI engine 402 is a component of the browser 432.

In some examples, notebook 408 comprises one or more cells 460. The one or more cells comprise respective executable instructions in the form of script or code that is executed within a context of a notebook adapter 406 component of the UDF engine 404 to generate respective result data for each cell that is run.

The predictable notebook system 400a supports two or more communication channels. A management channel 426 comprises management commands used to create and manage one or more notebooks, such as notebook 408. The management commands run in the context of the UI engine 402. In some examples, the management commands comprise Structured Query Language (SQL) commands. Example commands supported by the management channel 426 include, but are not limited to, are "Create" to create a notebook, "Delete" to delete a notebook, "Save" to save a notebook, and "SaveResults" to save the results of a notebook.

In some examples, a "SaveResults" command stores the results of a run for re-use. Notebooks are often used read-only views for business users. As a result, such command provides an explicit user save operation to update the results users will see. In some examples, such a command alleviates concurrency issues where a user is seeing results from another user using a notebook to explore a data set. In some examples, such a command allows a simpler security model, because there is an explicit action for sharing results. In some examples, having an explicit command to save reusable results provides for a quicker execution of one or more cells of the notebook.

In some examples, the execution platform 102 uses PUT operations to save results. During operation, the UI engine 402 performs a PUT operation to the notebook's storage location with a <cell_id>.bin file for each cell of a notebook the UI engine 402 caches results for. In some examples, this file is a stream of protocol buffer messages needed to reconstitute the cell. In some examples, the protocol buffer messages are composed in a language-agnostic Interface Definition Language (IDL) to define the structure of the cell data in a schema-like format. The schema defines the types of data fields, their names, and their hierarchical relationships.

In some examples, a "Save" or "SaveResults" operation runs in the context of the user 434 of the UI engine 402, not the notebook 408. For example, if the user 434 includes a "USE ROLE" command in a notebook cell, it will not affect the ability of the user 434 to save the notebook 408. In some examples, data of the management channel 426 is not affected by a command such as "USE ROLE" while data of the interaction channel 426 is affected by the command.

An interaction channel comprises interaction commands that run notebook cells, and update an in-memory state in the predictable notebook system 400a. These commands are run in the security context of the notebook 408. This means that running a "USE ROLE" command in a cell affects how the interaction commands are run. The interaction commands are issued by the UI engine 402 frontend during a cycle of interactions by the user 434 with the predictable notebook system 400a.

In some examples, the interaction channel comprises notebook messages 436 between the notebook UI application 416 and the UI engine 402. The notebook messages 436 are communicated via a UI engine 402 websocket. Some messages to the UI engine 402 to the notebook UI application 416 comprise components of a message path referring to which cells of a notebook the message is to go to. In some examples, the message path has a number of different semantics to run allowing users different ways to execute their notebooks.

The interaction channel further comprises a UI engine/notebook interaction channel 428 component for communications between the UI engine 402 and the compute service manager 104. Communications via the UI engine/notebook interaction channel 428 comprise messages that implement a UI engine to notebook communication protocol. The compute service manager 104 provides a notebook endpoint 410 for communications between the notebook UI application 416 and the predictable notebook system 400a when communicating over a Wide Area Network (WAN) such as the Internet or the like.

In some examples, when cells of the notebook 408 are run, the cells access, reads, and/or writes one or more notebook SQL objects 412 that are stored in the datastore 424.

The interaction channel further comprises a process interaction channel 430 used for communications between the compute service manager 104 and the UDF engine 404. In some examples, messages communicated through the process interaction channel 430 are composed in a dialect of a remote procedure call protocol such as Google Remote Procedure Call (gRPC) protocol.

FIG. 4B is a data structure diagram of a run cells message, in accordance with some examples. A run cells message 440 is used by the notebook UI application 416 to request a set of operations to be run for a notebook. In some examples, a run cells message 440 comprises a cell run type field 442 that specifies which cells to run.

A cell update semantics field 444 specifies whether a list of cells being passed down should be considered as the entire notebook, or as just updates to the notebook. In some examples, inserting, deleting, or re-ordering of the cells in a notebook is accomplished by sending a full notebook down with a REPLACE semantic. An INCREMENTAL semantic only allows content updates for existing cells.

A cell interaction semantics field 446 specifies an interaction across cells. In addition to the semantics fields, the run cells message 440 comprises a list of one or more cells, such as cell 448. The list of one or more cells is used to update an internal memory representation of the notebook. In some examples, the actual cells that are run are based on the cell run type field 442.

An identification 450 field contains a unique identifier of a cell. In some examples, the identifier is unique across the notebook. In some examples, the values in the identification 450 fields are internal structures that a user does not need to know.

A name 452 field contains an optional name, but when set, is unique across the notebook. In some examples, when looking up results, the value in the name 452 field is what will be used.

A type 454 field includes a value indicating a type of a cell. For example, a cell type may be a Markdown cell containing commands in a markup language, a SQL cell containing commands in SQL, a Python cell containing python code, or the like.

A code 456 field contains the actual code that will be run when evaluating a cell.

An output format 458 field contains any additional information needed to render results. If nothing is specified, a set of default semantics are used. The use of the output format 458 field allows a notebook UI application 416 to specify visual UI elements such as, but not limited to, charts, graphs, and the like, for displaying results to a user. For example, specifying VEGALITE will mean the results will be rendered using the high-level visualization grammar Vega-Lite and the configuration for the output format will be used as a Vega-Lite configuration.

Figure 5A:
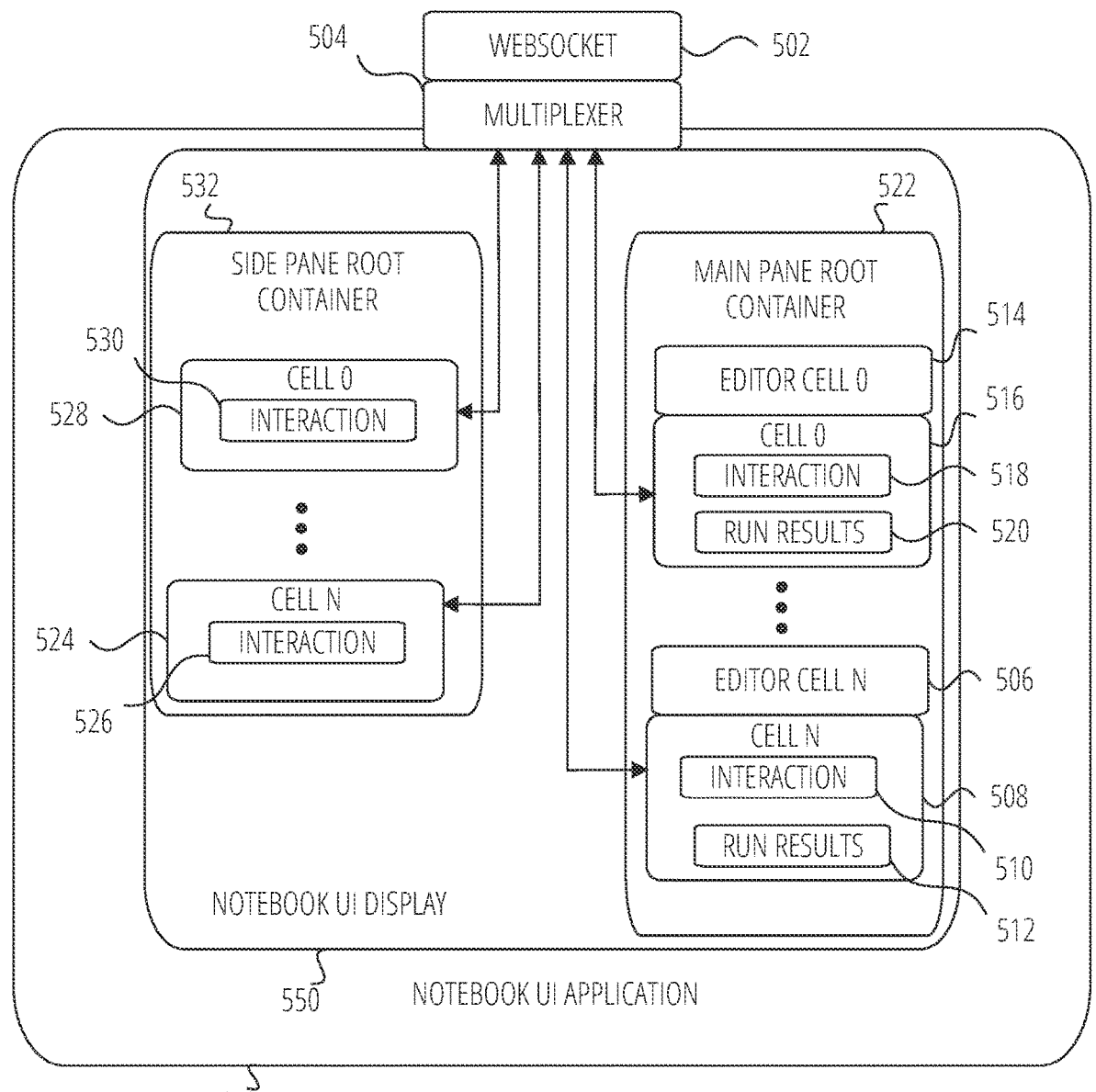
FIG. 5A is a data structure and data flow diagram of a notebook user interface, in accordance with some examples.
Figure 5B:
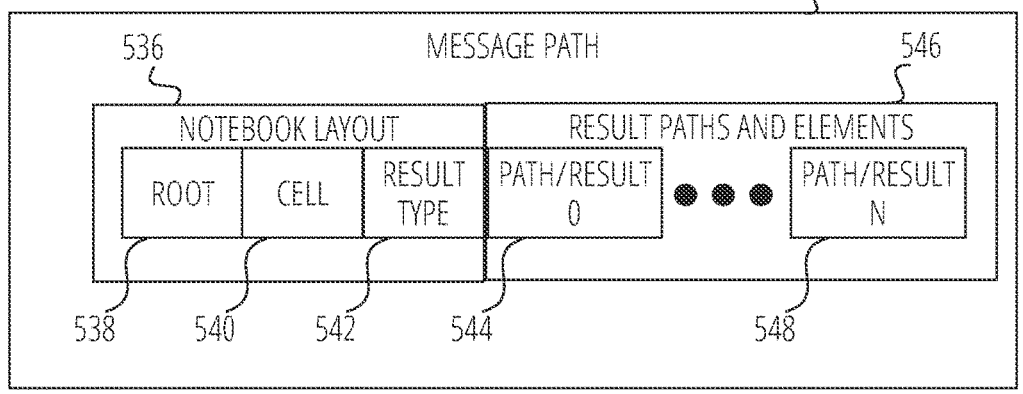
FIG. 5B is a data structure diagram of a message path, in accordance with some examples.

FIG. 5A is a data structure and data flow diagram of a notebook user interface, and FIG. 5B is a data structure diagram of a message path, in accordance with some examples. A predictable notebook system 400a uses a message path 534 to route messages to individual cell displays of a notebook UI application 416 (of FIG. 4A) via a multiplexer 504.

The notebook UI application 416 comprises one or more root containers of a notebook UI display 550 such as, but not limited to, a side pane root container 532 and a main pane root container 522. The root containers comprise one or more cell containers such as, but not limited to, cell 0 528 and cell N 524 of side pane root container 532, and cell 0 516 and cell N 508 of main pane root container 522. Each cell comprises one or more result containers such as, but not limited to, interaction UI results 518 and run results 520 of cell 0 516, interaction UI results 510 and run results 512 of cell N 508, interaction UI results 530 of cell 0 528, and interaction UI results 526 of cell N 524. Each cell is also associated with a respective editor, such as editor 514 and editor 506.

During operation, the predictable notebook system 400a generates messages having message paths such as, but not limited to, message path 534. Message path 534 is comprised of a notebook layout 536 component and a result paths and elements 546 component. The notebook layout 536 component is comprised of a root 538 field containing a value for an identification of a root container such as, but not limited to, side pane root container 532 or main pane root container 522, a cell 540 field containing an identification of a cell, and a result type 542 field containing a type of a result contained in the message. An example of field values are illustrated in Table 1 below:

TABLE 1

| Path Index | Container | Description | Values |
|---|---|---|---|
| 0 | Root Container | Topmost choice between sidebar or main | 0 == main<br>1 == sidebar |
| 1 | Cell Container | The cell this forward message to go to | Index of the cell this result was meant for |

TABLE 1-continued

| Path Index | Container | Description | Values |
|---|---|---|---|
| 2 | Result Type | Containers within the cell | 0 == Interaction UI<br>1 == Result |

The result paths and elements 546 comprises one or more result path and/or element path containers as indicated by path/result 0 544 and path/result N 548. Each result path container contains a result of a run of a respective cell from which the result will be rendered for display to a user. An element path container includes a path within a result itself to an element of the result.

During operation, the notebook UI application 416 receives and sends messages to a predictable notebook system using a websocket 502 coupled to a multiplexer 504. The multiplexer 504 component of the notebook UI application 416 routes messages from the predictable notebook system using a message path 534 of each message. As an example using Table 1, a message intended for the run results 520 container of cell 0 516 would have a message path where the root 538 field has a value of "0", a cell 540 field having a value of "0", a result type 542 field having a value of "1", and a result path container containing the result of the run of cell 0 516.

In some examples, messages sent from a predictable notebook system to a notebook UI application 416 are formatted as protocol buffers.

In some examples, a subset of a set of cells of a notebook may be run without running the cells that are not included in the subset. To do so, a notebook UI application 416 sends a notebook message to the predictable notebook system in order to have the predictable notebook system run a subset of the cells of the notebook. For example, the notebook UI application 416 sends an "add_block" message for each cell of the subset of cells to be run to the predictable notebook system. All cells that are run will have add_block messages sent for them in the main pane root container 522, as well as for an interaction UI result. An interaction UI block contains any messages sent as a result of running the cell. A result block for a return message is created if there is a non-null or non-delta generator result from running a cell. The result block contains a display for the result itself. The display has any output format specifications on the cell applied to it.

In some examples, the notebook UI application 416 is an internet-based user interface and uses Hypertext Markup Language (HTML) elements such as, but not limited to, inline Frames (iFrames) that allows the embedding of another HTML document within the notebook UI display 550. In some examples, the predictable notebook system 400a uses a UDF executed by a UDF engine 404 (of FIG. 4A) to generate the content for the HTML elements.

In some examples, not all cells will have messages created for them. If a cell was not run, it will not have an add_block message sent. As an example, a notebook UI application 416 may receive a delta path of [1, 2] without getting a delta path of [1, 1] meaning that a cell 2 was run, and a cell 1 was not. Accordingly, the UI should not change anything in the results for Cell 1.

In some examples, a file format for a notebook is the IPython Notebook (.ipynb) format. In some examples, results are ignored, that is during a file read process, the results are not processed. In some examples, notebook metadata is ignored as well. In some examples, cell metadata is used for storing a language type (e.g., Python, SQL, and the like), an output format, and a name or identification. In some examples, an identification is required for a cell. If a user does not supply an identification, an identification is created for the cell and cannot be removed by the user.

Figure 6:
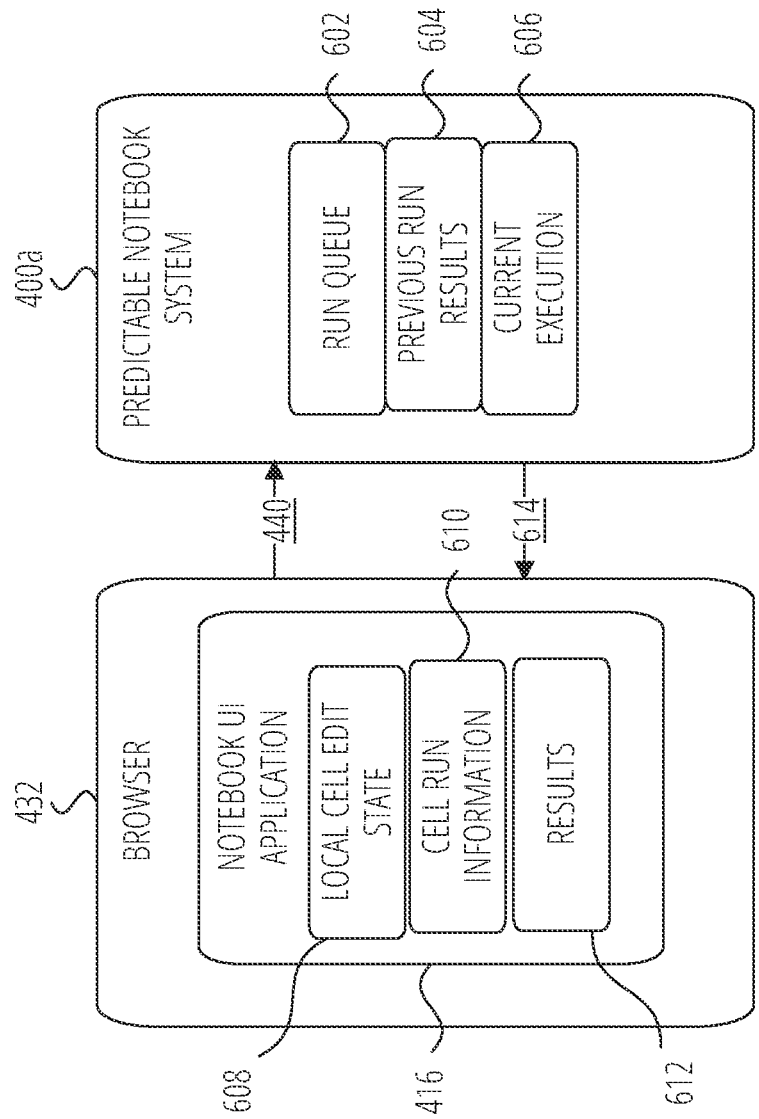
FIG. 6 is a collaboration diagram of a predictable notebook system and a notebook UI application, in accordance with some examples.

FIG. 6 is a collaboration diagram of a predictable notebook system 400a and a notebook UI application 416 of a browser 432 illustrating how a state is maintained for a notebook, in accordance with some examples. The predictable notebook system 400a and the notebook UI application 416 cooperate to provide a state for a creation and use of a notebook.

A component of the state data for a notebook is stored with the notebook in a document file and termed a "document state" herein. The notebook document includes cells and metadata. A use of the document is to store the code of each cell and metadata on how to run the code, without saving any results. The document contains metadata at both the cell and the document level. In some examples, the document is stored in an .ipynb format as described herein. The source of the document state data is the notebook UI application 416 as the notebook UI application 416 is the source of the local cell edit state 608 as a user uses the notebook UI application 416 to edit a notebook and the notebook's respective cells. The notebook UI application 416 is also responsible for displaying to the user results 612 and receiving commands from the user to save cell run information 610.

Another component of the state data for a notebook is an execution state comprising the information about what cells are running, and the results of the run. For example, the execution state data includes a state of an execution run queue 602, an in memory state of what cells have been run and previous run results 604 persisted results from previous runs, and a current execution 606 state of what cells are currently being executing or running.

A relationship between the document state and execution state is maintained through communication of a set of hashed messages that allows determination of how a given result maps to a document. For example, a content hash describes the document itself. A content hash comprises hashes of current cells of the notebook and of previous cells. An execution hash describes a particular run of one or more cells and allows determination of whether an executed run ran against a given document or another result. The predictable notebook system 400a is responsible for generating the hashes and returning them as part of its operations to the browser.

Execution of a run of a set of cells is initiated by a run cells message 440 (described in reference to FIG. 4B) that is communicated from the notebook UI application 416 to the predictable notebook system 400a. A cell run information message 614 is transmitted from the predictable notebook system 400a to the notebook UI application 416.

The cell run information message 614 message comprises one or more hashes and identifications that can be used by the UI engine (or other tools) to make different determinations about results. A predictable notebook system 400a uses a cell run information message 614 when fetching saved results from a datastore or rendering current results in the notebook UI application 416 (of FIG. 4A) to determine the results' level of staleness. Table 2 below summarizes an example set of hashes and their uses.

TABLE 2

| Hash | Contents | Use |
| --- | --- | --- |
| self_content_hash | Hash of the current cell's contents. | Determines whether the results match the current cell. However, it does not take into account previous cells. |
| full_content_hash | Hash of the current contents + full_content_hash of the previous cell. | Determines whether the results match the current notebook. This looks at previous nodes, so will not match if the current cell is unchanged, but the parent is. |
| run_id | A unique identification created for this run. | Uniquely identifies this run. |
| parent_execution_id | Combines the previous cell's full_content_hash and run_id to uniquely identify content and run. | Determines whether this run matches the previous cell's results. Catches cases where a previous cell was run after this cell and has possibly inconsistent results. |
| execution_id | Combines the run_id, self_content_hash and the parent_execution_id to get an id that uniquely identifies the content for this run. | Determines exact results, and can be used by later cells to see if they were built on this result. |

In some examples, a UI engine of the predictable notebook system matches a hash of a notebook document state to the hashes in the result stream. In some examples, the UI engine stores content hashes that come back from the results as part of the cell metadata in the document (e.g., a self content hash and a full content hash). In some examples, the UI engine implements functions to generate a self content hash and a full content hash locally.

Figure 7:
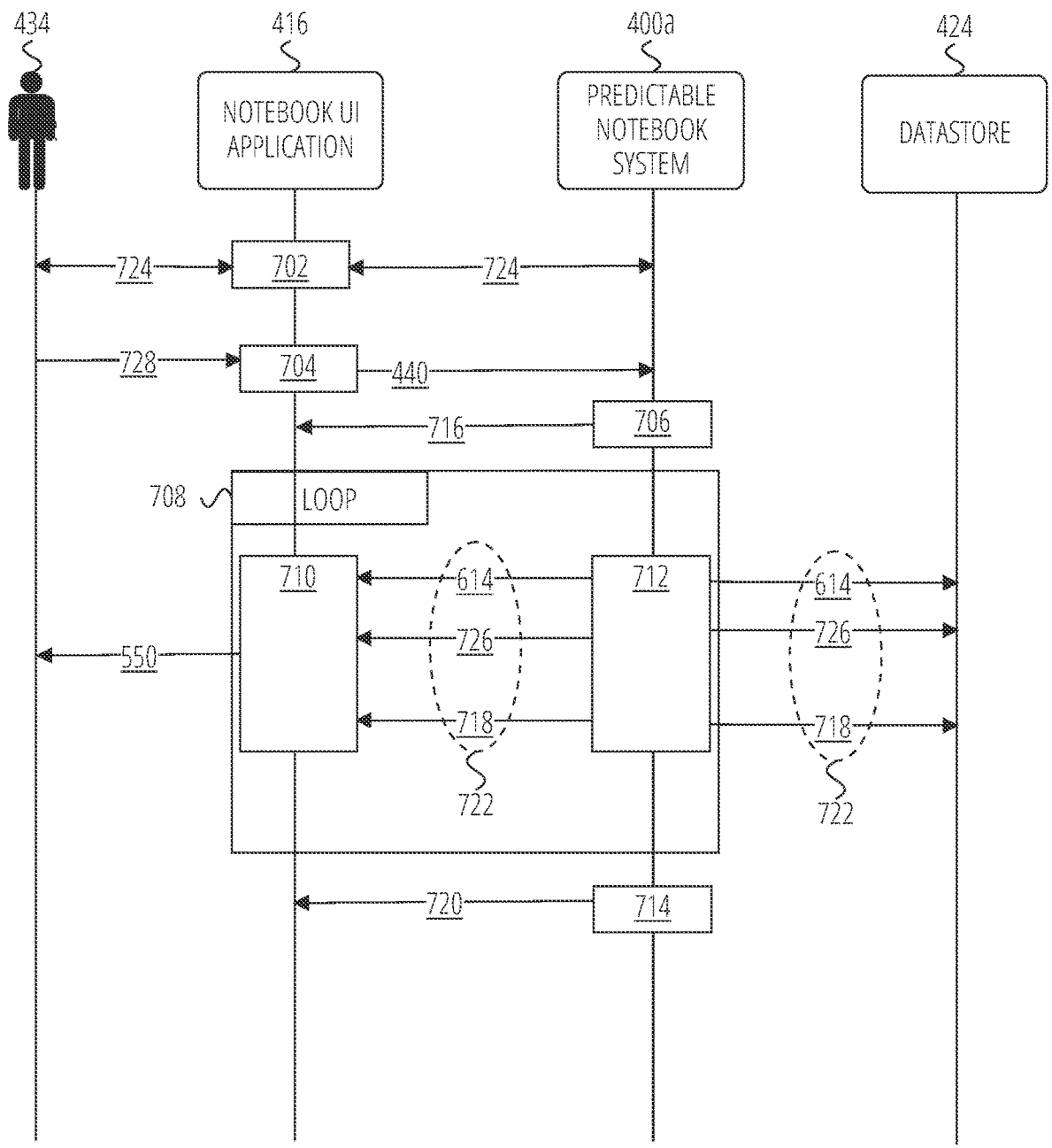
FIG. 7 is a sequence diagram of interactions between a notebook UI application and a predictable notebook system, in accordance with some examples.

FIG. 7 is a sequence diagram of interactions between a notebook UI application 416 and a predictable notebook system 400a, in accordance with some examples.

In operation 702, a user 434 uses a set of user interactions 724 with an editor 414 of a UI engine 402 of the predictable notebook system 400a via the notebook UI application 416 to create a notebook 408 (of FIG. 4A). For example, the notebook 408 is comprised of one or more cells. The one or more cells comprise respective executable instructions in the form of script or code that is executed by an execution platform 110 (of FIG. 1) of the predictable notebook system 400a to generate respective result data for each cell that is run. During an editing session, the UI engine 402 provides an editor 414 that the user 434 uses to create one or more notebook cell components using a library of the UI engine 402. A cell comprises a code input box as well as a results area. When a "run" button is selected, the code is transmitted across a websocket using a UDF protocol. When the predictable notebook system 400a runs the cell, results from the operations of the cell are populated into cell messages that are communicated by the predictable notebook system 400a to the notebook UI application 416 as described below.

In operation 704, the notebook UI application 416 receives a user input 728 from the user 434 indicating that the user wants to run one or more cells of the notebook 408. In response to receiving the user input, the notebook UI application 416 transmits a "run cells" message 440 (more fully described in reference to FIG. 4B) to the predictable notebook system 400a.

In operation 706, the predictable notebook system 400a transmits a notebook start message 716 to the notebook UI application 416. In some examples, a run cells message 440 may have one or more scopes such as, but not limited to, a "run a notebook" scope meaning running all of the cells of notebook 408, and a "run cell scope" meaning running a proper subset of a set of one or more of the cells in the notebook 408. Accordingly, the predictable notebook system 400a may transmit a notebook start message 716 and a notebook done message 720 to the notebook UI application 416 when running an entire notebook, and the predictable notebook system 400a may transmit a cell run information message 614 and a cell run done message 718 to the notebook UI application 416 when running a single cell. In some examples, the predictable notebook system 400a transmits two or more cell run information messages 614 and two or more cell run done messages 718 when running two or more cells in a notebook.

In some examples, a notebook start message 716 and a notebook done message 720 comprise data of which cells will run, and whether the predictable notebook system 400a is immediately going to re-run another queued request.

In some examples, a notebook start message 716 comprises data of which cells will be executed or run. In some examples, the notebook start message 716 comprises additional information such as any run cell messages that are combined as part of a current run.

In loop 708, the predictable notebook system 400a runs one or more cells of the notebook 408. For example, in operation 712, an execution task of an execution platform 110 (of FIG. 1) of the data platform 102 hosting the predictable notebook system 400a executes respective code of a cell of the notebook 408. During execution of the code of the cell, the execution task accesses, reads, and/or writes one or more objects of the data platform 102 hosting the predictable notebook system 400a. The execution task generates one or more results using the code of the cell and the one or more objects of the data platform. During the running of the one or more cells, the predictable notebook system 400a generates one or more cell messages, such as, but not limited to, a cell run information message 614, a cell forward message 726, and a cell run done message 718 using the results and transmits the one or more cell messages to the notebook UI application 416. In some examples, the cell messages are persisted as part of a cache of results.

As part of loop 708, in operation 710, the notebook UI application 416 receives the one or more cell messages and generates a notebook UI display 550 using the one or more cell messages. For example, the notebook UI application 416 receives the cell messages via a websocket 502 (of FIG. 5A) and the multiplexer 504 maps the one or more cell messages and the cell result data that they contain to their respective containers of a notebook UI display 550 (of FIG. 5A) as more fully described in reference to FIG. 5A and FIG. 5B. The notebook UI application 416 renders a notebook UI display 550 (of FIG. 5A) using the results and displays the notebook UI display 550 to the user 434.

In some examples, the one or more cell messages comprise a cell execution stream 722 that is returned to the notebook UI application 416 as part of the running of a cell. The cell execution stream 722 comprises all the messages sent as part of running a cell. The cell execution stream 722 itself is self-contained, so the cell execution stream 722 can be written into and out of a datastore 424 and retrieved later on. By doing so, the predictable notebook system 400a can retrieve results of previous cell runs for further processing as needed. In some examples, the cell execution stream 722 is stored at an addressable datastore location that may be accessed using a resource locator such as, but not limited to, a Uniform Resource Locator (URL) or the like.

In some examples, the cell execution stream 722 and the notebook 406 may have separate sets of access privileges applied to them. For example, a first consumer may have access privileges to edit the notebook 406 and run cells of the notebook 406 while a second consumer may have access privileges only to view the results of running the cells of the notebook 406 in the form of the cell execution stream 722. This allows for authorization and sharing of the notebook 406 and the cell execution stream 722 to be done independently. In some examples, the use of separate sets of access privileges allows for data of results of running the notebook 406 to be private result data or shared result data.

In some examples, the results are stored in the datastore 424 and the messages of the cell execution stream 722 include a resource locator such as, but not limited to, a URL. In operation 710, the notebook UI application 416 uses the resource locator to retrieve the results from the datastore 424.

In some examples, the cell execution stream 722 is stored at a location that is separate from a location where a respective notebook or cell is stored. This provides for the separate storage and management of the code of the cells of a notebook and the results of running the cells.

In some examples, the data platform 102 uses a Role-Based Access Control (RBAC) system and the cell execution stream 722 is stored as data that is private to the user 434 in accordance with a role assigned to the user. When the cell execution stream 722 is stored in this way, only other users having the same assigned role can access the results of running a cell. In some examples, the cell execution stream 722 is stored so that it may be publicly shared.

In some examples, when the predictable notebook system 400a receives a run cells message 440 and runs one or more cells using the run cells message 440, the predictable notebook system 400a returns messages of the cell execution stream in one or more stages. In a stage, a cell run information message 614 includes hashes specifying how results relate to a notebook and its display of results. In another stage, one or more cell forward messages, such as cell forward message 726, wrap all of the forward messages communicated by the 400a to the notebook UI application 416, and map them explicitly to a cell of the notebook. In another stage, a cell run done message 718 informs any components of the data platform 102 hosting the predictable notebook system 400a that the predictable notebook system 400a is saving the cell execution stream, or the notebook UT application 416 that a cell is done running and a final state of the cell such as, but not limited to, a success state, error state, or the like.

In some examples, the predictable notebook system 400a streams out and saves the results for each cell run. For example, when a UDF controller is executed by the predictable notebook system 400a execution task during the running of a cell, the running of the cell starts up with a "persist results" parameter of a Schema Dataflow Language (SDL). The parameter includes volume and prefix to write the user-specific results to and a flag telling the controller to write out intermediate results.

In operation 714, the predictable notebook system 400a determines that all of the cells of the notebook that were specified to be run in the run cells message 440 and transmits a notebook done message 720 to the notebook UI application 416. In some examples, the notebook done message 720 comprises a state data of the running of the cells of the notebook 408. An execution state is a "running" state, the predictable notebook system 400a will re-run a set of cells of a notebook using one or more run cells messages. In some examples, if a notebook done message 720 includes an error result, it is because there was a system error. In some examples, if user code of a cell throws exceptions or does not work, the notebook done message 720 returns a success state as the error was not a system error but a coding error.

Figure 8:
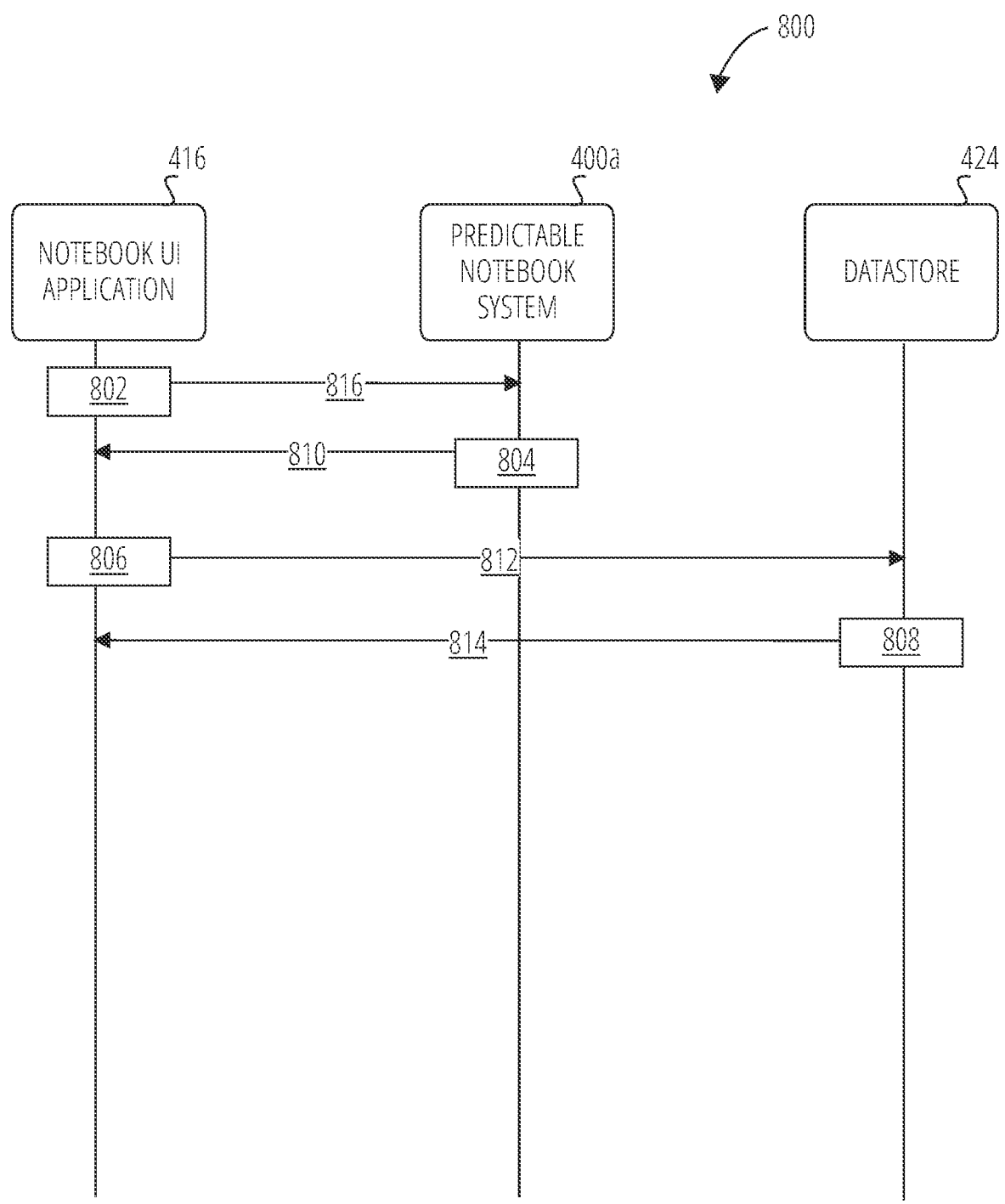
FIG. 8 is a sequence diagram of a results loading method, in accordance with some examples.

FIG. 8 is a sequence diagram of a results loading method 800, in accordance with some examples. A predictable notebook system 400a (of FIG. 4A) uses the results loading method 800 to load previously stored results from a cell into memory.

In operation 802, when starting up a notebook, a notebook UI application 416 transmits a previous results message 816 to the predictable notebook system 400a, after the notebook UI application 416 loads the notebook content.

In operation 804, in response to receiving the previous results message 816, the predictable notebook system 400a starts up and transmits a previous results response 810 to the notebook UI application 416. The previous results response 810 comprises an address of a data storage location such as, but not limited to, a Uniform Resource Locator (URL), of one or more cell execution streams 814 from previously run cells of the loaded notebook that are stored in a datastore 424.

In operation 806, the notebook UI application 416 uses the previous results response 810 to retrieve the one or more cell execution streams 814 from the location on the datastore 424. For example, the notebook UI application 416 transmits a get message 812 to the datastore 424. In response to receiving the get message 812, in operation 808, the datastore 424 transmits the one or more cell execution streams 814 to the notebook UI application 416 and the notebook UI application 416 receives the cell execution streams 814.

In some examples, result retrieval does not require the notebook's process to be started. In some examples, the retrieval process starts-up the notebook process in the background to make interactions faster when the user decides to do something. In some examples, transmission of the previous results message 816 by the notebook UI application 416 to the predictable notebook system 400a initiates a soft-start of a notebook's process. Soft-starting the notebook process starts the notebook process but does not run any cells of the notebook.

Figure 9A:
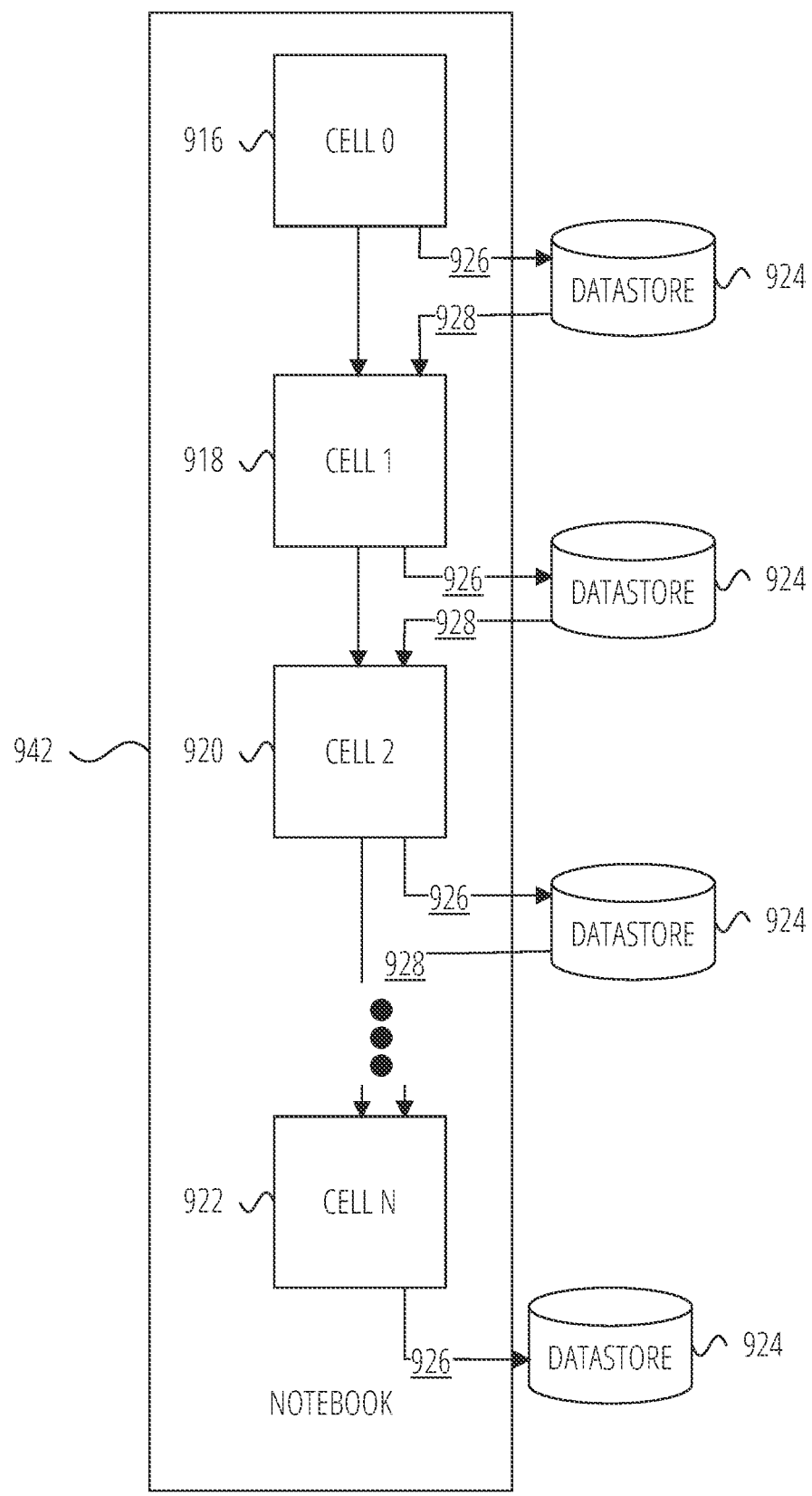
FIG. 9A is a collaboration diagram of a cell run sequencing method, in accordance with some examples.
Figure 9B:
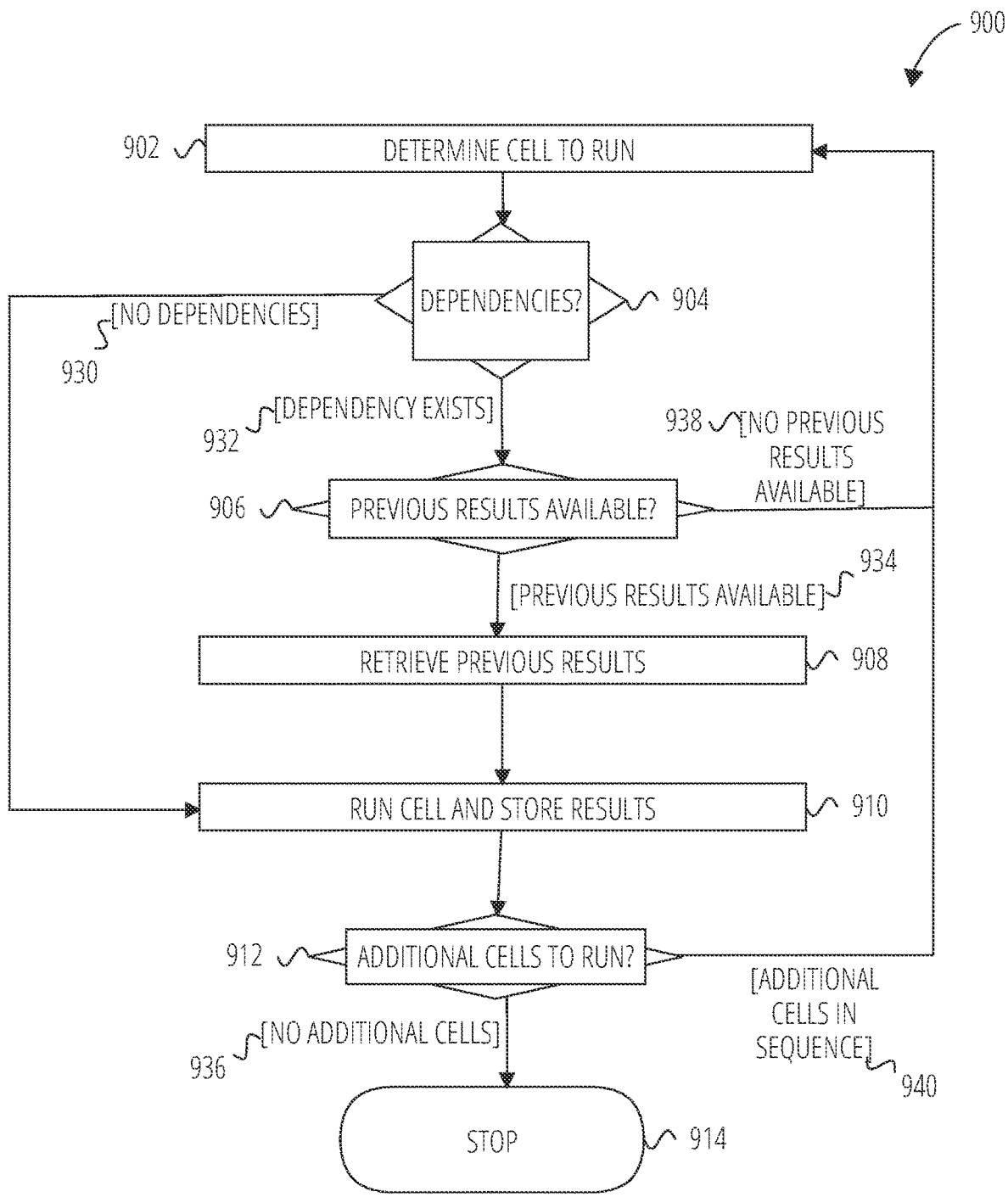
FIG. 9B is an activity diagram of a cell run sequencing method, in accordance with some examples.

FIG. 9A is a collaboration diagram of a cell run sequencing method 900, and FIG. 9B is an activity diagram of the cell run sequencing method 900, in accordance with some examples. A predictable notebook system 400a (of FIG. 4A) uses the cell run sequencing method 900 to run one or more cells of a notebook and establish a scope of variables and results for the cells.

In some examples, a set of cells of a notebook is an ordered set of cells and the cells are run in a sequence in accordance with a cell order of the ordered set. For example, as illustrated in FIG. 9A, notebook 942 is comprised of cell 0 916, cell 1 918, and cell 2 920 to cell N 922. Any cell in the ordered set of cells may be run alone or may be the start of an ordered subset of cells to be run. When a cell is run, a set of current results 926 are stored in a datastore 924 as a cell execution stream (as more fully described in reference to FIG. 7). A cell may or may not have a dependency on variables or results of a previous cell in the sequence. When a dependency exists, the predictable notebook system 400a retrieves a set of previous results 928 from the datastore 924 (as described more fully in reference to FIG. 8) before running the current cell.

In operation 902, the predictable notebook system 400a determines which cell of the cells of the notebook is to be run as a current cell. For example, the predictable notebook system 400a receives a run cells message 440 (as more fully described in reference to FIG. 4B) from a notebook UI application 416 and determines which cell to run using the run cells message 440 (as more fully described in reference to FIG. 7).

In operation 904, the predictable notebook system 400a determines if the current cell has any dependencies. For example, when a cell may have dependencies on a previous cell, the predictable notebook system 400a uses the code of the current cell to determine dependencies by analyzing the code of the current cell to find references to previous results or variables of one or more preceding cells in the ordered set of cells. In some examples, a cell may only have dependencies in an immediately preceding cell. By doing so, a dynamic variable scope is created for each current cell when it runs, where the dynamic variable scope includes the variables and results of the current cell and its immediately preceding cell.

In response to determining that no dependencies exist 930, the predictable notebook system 400a transitions to operation 910. In response to determining that dependencies exist 932, the predictable notebook system 400a transitions to operation 906.

In operation 906, the predictable notebook system 400a determines an availability of a set of previous results from a previous run of the cell in which the current cell has dependencies. For example, the predictable notebook system 400a searches the datastore 924 for a set of previous results from the cell in which the current cell has dependencies is stored on the datastore 924. In response to determining that previous results are available 934, the predictable notebook system 400a transitions to operation 908. In some examples, the predictable notebook system 400a determines a staleness of the stored previous results using a cell run information message 614 (of FIG. 6). The predictable notebook system 400a determines that a set of previous results are not available based on a staleness of the set of previous results satisfying a threshold constraint. In some examples, satisfying a threshold constraint comprises determining that the set of previous results are older than a specified run date.

In response to determining that previous results are not available 938, the predictable notebook system 400a transitions to operation 902. In operation 902, the predictable notebook system 400a determines to run the cell in which the current cell has dependencies as the current cell in order to generate a set of results that can be used in running a subsequent cell. After setting as the current cell the cell in which the current cell has dependencies, the predictable notebook system 400a continues operations at operation 904.

In operation 906, in response to determining that the previous results are available 934, the predictable notebook system 400a transitions to operation 908.

In operation 908, the 400a retrieves the previous results as described in reference to FIG. 8 and transitions to operation 910.

In operation 910, the predictable notebook system 400a runs the current cell and stores the results of running the current cell in the datastore 924 (as more fully described in reference to FIG. 7) and transitions to operation 912.

In operation 912, the predictable notebook system 400a determines if there are additional cells in a sequence to run. For example, the predictable notebook system 400a uses the run cells message 440 to determine whether there are additional cells to run. In response to determining that there are additional cells in the sequence to run 940, the predictable notebook system 400*a* transitions to operation 902 and continues operations. In response to determining that there are no additional cells in the sequence to run 936, the predictable notebook system 400*a* transitions to a stop state 914.

Figure 10:
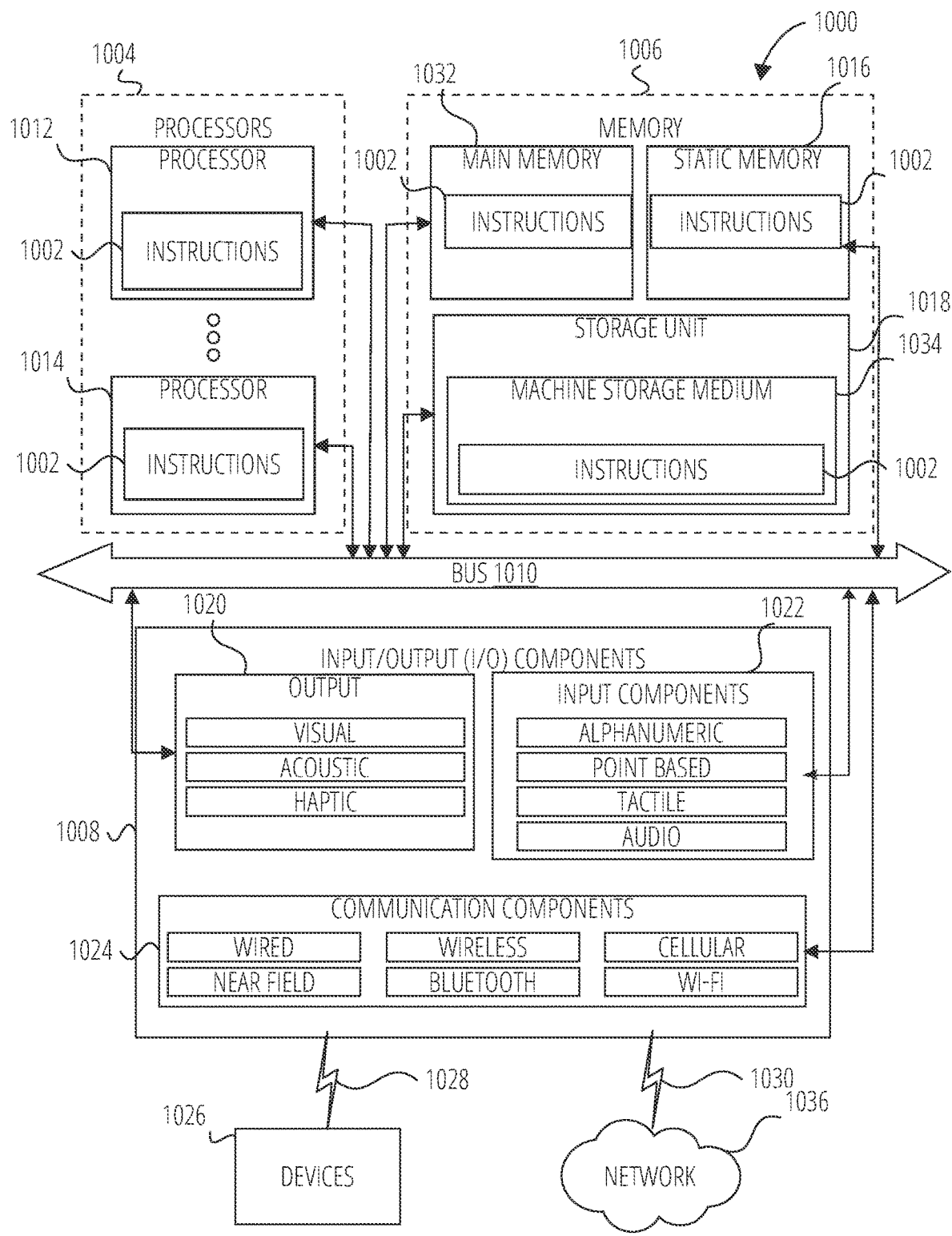
FIG. 10 illustrates a diagrammatic representation of a machine in the form of a computer system within which a set of instructions may be executed for causing the machine to perform any one or more of the methodologies discussed herein, in accordance with some examples.

FIG. 10 illustrates a diagrammatic representation of a machine 1000 in the form of a computer system within which a set of machine-readable instructions may be executed for causing the machine 1000 to perform any one or more of the methodologies discussed herein, according to examples. Specifically, FIG. 10 shows a diagrammatic representation of the machine 1000 in the example form of a computer system, within which computer-readable instructions 1002 (e.g., software, a program, an application, an applet, a data application, or other executable code) for causing the machine 1000 to perform any one or more of the methodologies discussed herein may be executed. For example, the instructions 1002 may cause the machine 1000 to execute any one or more operations of any one or more of the methods described herein. In this way, the instructions 1002 transform a general, non-programmed machine into a particular machine 1000 (e.g., the compute service manager 104, the execution platform 110, and the data storage devices 1 to N of data storage 106) that is specially configured to carry out any one of the described and illustrated functions in the manner described herein.

In alternative examples, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1002, sequentially or otherwise, that specify actions to be taken by the machine 1000. Further, while only a single machine 1000 is illustrated, the term "machine" shall also be taken to include a collection of machines that individually or jointly execute the instructions 1002 to perform any one or more of the methodologies discussed herein.

The machine 1000 includes processors 1004, memory 1006, and I/O components 1008 configured to communicate with each other such as via a bus 1010. In some examples, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, multiple processors as exemplified by processor 1012 and a processor 1014 that may execute the instructions 1002. The term "processor" is intended to include multi-core processors that may comprise two or more independent processors (sometimes referred to as "cores") that may execute instructions 1002 contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory 1006 may include a main memory 1032, a static memory 1016, and a storage unit 1018 including a machine storage medium 1034, all accessible to the processors 1004 such as via the bus 1010. The main memory 1032, the static memory 1016, and the storage unit 1018 store the instructions 1002 embodying any one or more of the methodologies or functions described herein. The instructions 1002 may also reside, completely or partially, within the main memory 1032, within the static memory 1016, within the storage unit 1018, within at least one of the processors 1004 (e.g., within the processor's cache memory), or any suitable combination thereof, during execution thereof by the machine 1000.

The input/output (I/O) components 1008 include components to receive input, provide output, produce output, transmit information, exchange information, capture measurements, and so on. The specific I/O components 1008 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1008 may include many other components that are not shown in FIG. 10. The I/O components 1008 are grouped according to functionality merely for simplifying the following discussion and the grouping is in no way limiting. In various examples, the I/O components 1008 may include output components 1020 and input components 1022. The output components 1020 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1022 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1008 may include communication components 1024 operable to couple the machine 1000 to a network 1036 or devices 1026 via a coupling 1030 and a coupling 1028, respectively. For example, the communication components 1024 may include a network interface component or another suitable device to interface with the network 1036. In further examples, the communication components 1024 may include wired communication components, wireless communication components, cellular communication components, and other communication components to provide communication via other modalities. The devices 1026 may be another machine or any of a wide variety of peripheral devices (e.g., a peripheral device coupled via a universal serial bus (USB)). For example, as noted above, the machine 1000 may correspond to any one of the compute service manager 104, the execution platform 110, and the devices 1026 may include the data storage device 226 or any other computing device described herein as being in communication with the data platform 102 or the data storage 106.

The various memories (e.g., 1006, 1016, 1032, and/or memory of the processor(s) 1004 and/or the storage unit 1018) may store one or more sets of instructions 1002 and data structures (e.g., software) embodying or utilized by any one or more of the methodologies or functions described herein. These instructions 1002, when executed by the processor(s) 1004, cause various operations to implement the disclosed examples.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 1036 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1036 or a portion of the network 1036 may include a wireless or cellular network, and the coupling 1030 may be a Code Division Multiple Access (CDMA) connection, a Global System for Mobile communications (GSM) connection, or another type of cellular or wireless coupling. In this example, the coupling 1030 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1002 may be transmitted or received over the network 1036 using a transmission medium via a network interface device (e.g., a network interface component included in the communication components 1024) and utilizing any one of a number of well-known transfer protocols (e.g., hypertext transfer protocol (HTTP)). Similarly, the instructions 1002 may be transmitted or received using a transmission medium via the coupling 1028 (e.g., a peer-to-peer coupling) to the devices 1026. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1002 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methodologies disclosed herein may be performed by one or more processors. The performance of certain of the operations may be distributed among the one or more processors, not only residing within a single machine, but also deployed across a number of machines. In some examples, the processor or processors may be located in a single location (e.g., within a home environment, an office environment, or a server farm), while in other examples the processors may be distributed across a number of locations.

Additional Examples Include

Example 1. A computer-implemented method comprising: receiving, by at least one processor, from a notebook User Interface (UI) application, a run cells message, the run cells message specifying a subset of cells of a set of cells of a notebook to run; and for each cell in the subset of cells, performing operations comprising: running, by the at least one processor, the cell to generate a set of results; generating, by the at least one processor, a cell execution stream using the set of results; storing, by the at least one processor, the cell execution stream; and transmitting, by the at least one processor, the cell execution stream to the notebook UI application, wherein the notebook UI application generates a display presented to a user using the cell execution stream.

Example 2. The computer-implemented method of example 1, wherein the subset of cells is a proper subset.

Example 3. The computer-implemented method of any of examples 1 and 2, wherein the set of cells is an ordered set.

Example 4. The computer-implemented method of any of examples 1-3, wherein the subset of cells is an ordered set and the subset of cells are run in a sequence in accordance with a cell order of the subset of cells.

Example 5. The computer-implemented method of any of examples 1-4, wherein running the each cell comprises: determining a dependency of the each cell on a previous result of a preceding cell; determining an availability of the previous result of the preceding cell; in response to determining the previous result of the preceding cell is available, retrieving the result of the preceding cell; and in response to determining the previous result of the preceding cell is not available, running the preceding cell to generate the previous result.

Example 6. The computer-implemented method of any of examples 1-5, wherein the run cells message comprises a cell update semantics field that specifies whether the subset of cells is an update of the notebook.

Example 7. The computer-implemented method of any of examples 1-6, wherein the cell execution stream is stored separately from the notebook.

Example 8. The computer-implemented method of any of examples 1-7, further comprising: loading the notebook; and soft-starting the notebook by retrieving the cell execution stream.

Example 9. The computer-implemented method of any of examples 1-8, wherein the cell execution stream comprises a message path specifying a cell of the notebook UI display for display of the set of results.

Example 10. The computer-implemented method of any of examples 1-9, wherein the message path includes a root field that specifying a pane of the notebook UI display for display of the set of results.

Example 11. A data platform comprising: at least one processor; and at least one memory storing instructions that, when executed by the at least one processor, cause the data platform to perform operations comprising: receiving from a notebook UI application, a run cells message, the run cells message specifying a subset of cells of a set of cells of a notebook to run; and for each cell in the subset of cells, performing operations comprising: running the each cell to generate a set of results; generating a cell execution stream using the set of results; storing the cell execution stream; and transmitting the cell execution stream to the notebook UI application, wherein the notebook UI application generates a display presented to a user using the cell execution stream.

Example 12. The data platform of example 11, wherein the subset of cells is a proper subset.

Example 13. The data platform of any of examples 11 and 12, wherein the set of cells is an ordered set.

Example 14. The data platform of any of examples 11-13, wherein the subset of cells is an ordered set and the subset of cells are run in a sequence in accordance with a cell order of the subset of cells.

Example 15. The data platform of any of examples 11-14, wherein running the each cell comprises: determining a dependency of the each cell on a previous result of a preceding cell; determining an availability of the previous result of the preceding cell; in response to determining the previous result of the preceding cell is available, retrieving the result of the preceding cell; and in response to determining the previous result of the preceding cell is not available, running the preceding cell to generate the previous result.

Example 16. The data platform of any of examples 11-15, wherein the run cells message comprises a cell update semantics field that specifies whether the subset of cells is an update of the notebook.

Example 17. The data platform of any of examples 11-16, wherein the cell execution stream is stored separately from the notebook.

Example 18. The data platform of any of examples 11-17, wherein the operations further comprise: loading the notebook; and soft-starting the notebook by retrieving the cell execution stream.

Example 19. The data platform of any of examples 11-18, wherein the cell execution stream comprises a message path specifying a cell of the notebook UI display for display of the set of results.

Example 20. The data platform of any of examples 11-19, wherein the message path includes a root field specifying a pane of the notebook UI display for display of the set of results.

Example 21. A machine-storage medium comprising machine-readable instructions that, when executed by a machine, cause the machine to perform operations comprising: receiving from a notebook UI application, a run cells message, the run cells message specifying a subset of cells of a set of cells of a notebook to run; and for each cell in the subset of cells, performing operations comprising: running the each cell to generate a set of results; generating a cell execution stream using the set of results; storing the cell execution stream; and transmitting the cell execution stream to the notebook UI application, wherein the notebook UI application generates a display presented to a user using the cell execution stream.

Example 22. The machine-storage medium of example 21, wherein the subset of cells is a proper subset.

Example 23. The machine-storage medium of any of example 21-22, wherein the set of cells is an ordered set.

Example 24. The machine-storage medium of any of example 21-23, wherein the subset of cells is an ordered set and the subset of cells are run in a sequence in accordance with a cell order of the subset of cells.

Example 25. The machine-storage medium of any of example 21-24, wherein running the each cell comprises: determining a dependency of the each cell on a previous result of a preceding cell; determining an availability of the previous result of the preceding cell; in response to determining the previous result of the preceding cell is available, retrieving the result of the preceding cell; and in response to determining the previous result of the preceding cell is not available, running the preceding cell to generate the previous result.

Example 26. The machine-storage medium of any of example 21-25, wherein the run cells message comprises a cell update semantics field that specifies whether the subset of cells is an update of the notebook.

Example 27. The machine-storage medium of any of example 21-26, wherein the cell execution stream is stored separately from the notebook.

Example 28. The machine-storage medium of any of example 21-27, wherein the operations further comprise: loading the notebook; and soft-starting the notebook by retrieving the cell execution stream.

Example 29. The machine-storage medium of any of example 21-28, wherein the cell execution stream comprises a message path specifying a cell of the notebook UI display for display of the set of results.

Example 30. The machine-storage medium of any of example 21-29, wherein the message path includes a root field specifying a pane of the notebook UI display for display of the set of results.

Although the examples of the present disclosure have been described with reference to specific examples, it will be evident that various modifications and changes may be made to these examples without departing from the broader scope of the inventive subject matter. Accordingly, the specification and drawings are to be regarded in an illustrative rather than a restrictive sense. The accompanying drawings that form a part hereof show, by way of illustration, and not of limitation, specific examples in which the subject matter may be practiced. The examples illustrated are described in sufficient detail to enable those skilled in the art to practice the teachings disclosed herein. Other examples may be used and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Such examples of the inventive subject matter may be referred to herein, individually and/or collectively, by the term "example" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art, upon reviewing the above description.

What is claimed is:

1. A computer-implemented method comprising:
   receiving, by at least one processor, from a notebook User Interface (UI) application, a run cells message, the run cells message specifying a subset of cells of a set of cells of a notebook to run; and
   for each cell in the subset of cells, performing operations comprising:
      running, by the at least one processor, each cell to generate a set of results, the running comprising:
         determining a dependency of each cell on a previous result of a preceding cell:
         determining an availability of the previous result of the preceding cell;
         in response to determining the previous result of the preceding cell is available, retrieving the result of the preceding cell; and
         in response to determining the previous result of the preceding cell is not available, running the preceding cell to generate the previous result;
      generating, by the at least one processor, a cell execution stream using the set of results;
      storing, by the at least one processor, the cell execution stream; and
      transmitting, by at least one processor, the cell execution stream to the notebook UI application, wherein the notebook UI application generates a display presented to a user using the cell execution stream.

2. The computer-implemented method of claim 1, wherein the subset of cells comprises proper subset.

3. The computer-implemented method of claim 1, wherein the set of cells comprises an ordered set.

4. The computer-implemented method of claim 3, wherein the subset of cells is an ordered set and the subset of cells are run in a sequence in accordance with a cell order of the subset of cells.

5. The computer-implemented method of claim 1, wherein the run cells message comprises a cell update semantics field that specifies whether the subset of cells is an update of the notebook.

6. The computer-implemented method of claim 1, wherein the cell execution stream is stored separately from the notebook.

7. The computer-implemented method of claim 1, further comprising:
   loading the notebook; and
   soft-starting the notebook by retrieving the cell execution stream.

8. The computer-implemented method of claim 1, wherein the cell execution stream comprises a message path specifying a cell of the notebook UI display for display of the set of results.

9. The computer-implemented method of claim 1, wherein access privileges to the notebook and the cell execution stream are different.

10. A data platform comprising:
    at least one processor; and
    at least one memory storing instructions that, when executed by the at least one processor, cause the data platform to perform operations comprising:
       receiving from a notebook UI application, a run cells message, the run cells message specifying a subset of cells of a set of cells of a notebook to run; and
       for each cell in the subset of cells, performing operations comprising:
          running each cell to generate a set of results, the running comprising:
             determining a dependency of each cell on a previous result of a preceding cell:
             determining an availability of the previous result of the preceding cell:
             in response to determining the previous result of the preceding cell is available, retrieving the result of the preceding cell; and
             in response to determining the previous result of the preceding cell is not available, running the preceding cell to generate the previous result;
          generating a cell execution stream using the set of results;
          storing the cell execution stream; and
          transmitting the cell execution stream to the notebook UI application, wherein the notebook UI application generates a display presented to a user using the cell execution stream.

11. The data platform of claim 10, wherein the subset of cells comprises a proper subset.

12. The data platform of claim 10, wherein the set of cells comprises an ordered set.

13. The data platform of claim 12, wherein the subset of cells is an ordered set and the subset of cells are run in a sequence in accordance with a cell order of the subset of cells.

14. The data platform of claim 10, wherein the run cells message comprises a cell update semantics field that specifies whether the subset of cells is an update of the notebook.

15. The data platform of claim 10, wherein the cell execution stream is stored separately from the notebook.

16. The data platform of claim 10, wherein the operations further comprise:
    loading the notebook; and
    soft-starting the notebook by retrieving the cell execution stream.

17. The data platform of claim 10, wherein the cell execution stream comprises a message path specifying a cell of the notebook UI display for display of the set of results.

18. The data platform of claim 10, wherein access privileges to the notebook and the cell execution stream are different.

19. A machine-storage medium comprising machine-readable instructions that, when executed by a machine, cause the machine to perform operations comprising:
  receiving from a notebook UI application, a run cells message, the run cells message specifying a subset of cells of a set of cells of a notebook to run; and
  for each cell in the subset of cells, performing operations comprising:
    running each cell to generate a set of results, the running comprising:
      determining a dependency of each cell on a previous result of a preceding cell:
      determining an availability of the previous result of the preceding cell;
      in response to determining the previous result of the preceding cell is available, retrieving the result of the preceding cell; and
      in response to determining the previous result of the preceding cell is not available, running the preceding cell to generate the previous result;
    generating a cell execution stream using the set of results;
    storing the cell execution stream; and
    transmitting the cell execution stream to the notebook UI application, wherein the notebook UI application generates a display presented to a user using the cell execution stream.

20. The machine-storage medium of claim 19, wherein the subset of cells comprises a proper subset.

21. The machine-storage medium of claim 19, wherein the set of cells comprises an ordered set.

22. The machine-storage medium of claim 21, wherein the subset of cells is an ordered set and the subset of cells are run in a sequence in accordance with a cell order of the subset of cells.

23. The machine-storage medium of claim 19, wherein the run cells message comprises a cell update semantics field that specifies whether the subset of cells is an update of the notebook.

24. The machine-storage medium of claim 19, wherein the cell execution stream is stored separately from the notebook.

25. The machine-storage medium of claim 19, wherein the operations further comprise:
  loading the notebook; and
  soft-starting the notebook by retrieving the cell execution stream.

26. The machine-storage medium of claim 19, wherein the cell execution stream comprises a message path specifying a cell of the notebook UI display for display of the set of results.

27. The machine-storage medium of claim 19, wherein access privileges to the notebook and the cell execution stream are different.

\* \* \* \* \*